W. G. TEMPLETON.
WEIGHING SCALE.
APPLICATION FILED SEPT. 24, 1919.

1,394,696.

Patented Oct. 25, 1921.
2 SHEETS—SHEET 2.

Witness
H. B. Worden.

Inventor
W. G. Templeton
By C. A. Snow & Co.
Attorneys.

UNITED STATES PATENT OFFICE.

WILLIAM G. TEMPLETON, OF COLORADO SPRINGS, COLORADO.

WEIGHING-SCALE.

1,394,696.     Specification of Letters Patent.     Patented Oct. 25, 1921.

Application filed September 24, 1919. Serial No. 325,880.

*To all whom it may concern:*

Be it known that I, WILLIAM G. TEMPLETON, a citizen of the United States, residing at Colorado Springs, in the county of El Paso and State of Colorado, have invented a new and useful Weighing-Scales, of which the following is a specification.

This invention relates to scales for use in weighing various articles and materials, one of its objects being to utilize the principles of hydrostatics for maintaining the equilibrium of the scales under normal conditions instead of depending upon systems of levers, weights, springs, etc., as heretofore, thereby greatly simplifying the construction of the scales, by reducing the number of the parts, and also producing a structure of great accuracy the tendency of which is always to maintain an accurate balance. Thus the scales are primarily distinguished from those requiring accurate adjustment and many bearings the wear on which tends to render the scales less accurate during continued use.

Another object is to provide scales in which the relative buoyancy of controlling members is such as to maintain the indicating element of the scales normally in a predetermined relation irrespective of variations in the depth of the fluid body into which the said members extend, whereby evaporation of the fluid or reduction in quantity thereof from any cause will not affect the accuracy of the scales.

A still further object is to provide scales in which a controlling fluid operates to retard the operation of the scales without affecting their accuracy.

Another object is to provide hydromechanical balancing means which is applicable to scales of various types.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth.

In the accompanying drawings the preferred forms of the invention have been shown.

In said drawings—

Figure 1:
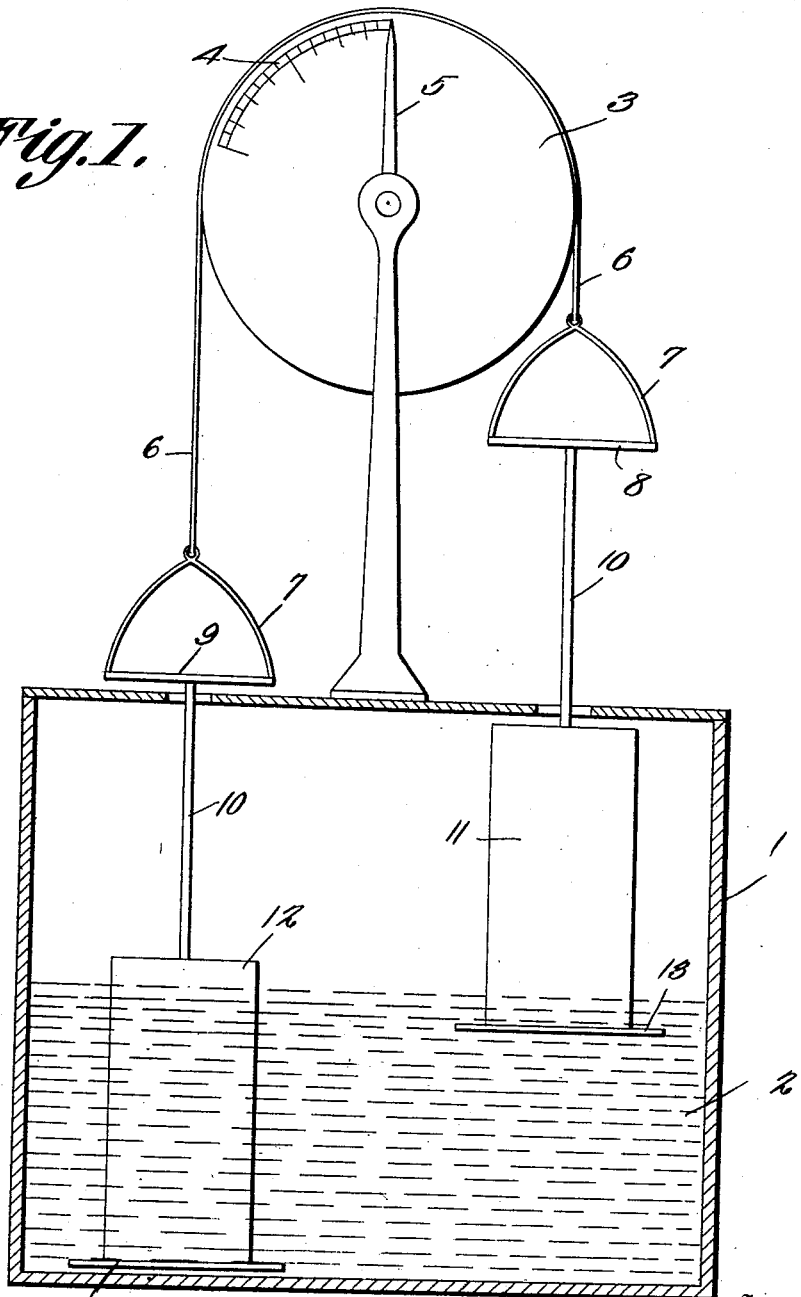
Figure 1 is a section through apothecaries' scales having the present improvements.

Referring to the figures by characters of reference, 1 designates a container for liquid, shown at 2, and located above this container in suitable bearing provided therefor is a rotary indicator. In the form shown in Fig. 1 the indicator is in the form of a wheel 3 having graduations 4 designating units of measure and fractions thereof. A stationary pointer 5 is located near the graduated face of the wheel and is adapted normally to indicate the first or zero graduation. To the wheel is attached a flexible band 6 the ends of which are attached in any manner desired, as by means of bails 7, to pans 8 and 9. A stem 10 projects downwardly from each pan and into the container 1 and secured to the lower ends of these stems are controlling members 11 and 12 each of which is preferably provided with an annular flange 13. The member 12 is located under the pan 9 and is heavier than the member 11 which is located under the pan 8. The size and proportions of both members are equal. By reason of the unequal weight of the members 12 and 11 and in view of the fact that both members project below the surface of the liquid 2 at all times, it will be understood that the member 12 will overbalance member 11 to lift said member 11 while the member 12 descends within the fluid. This movement will continue until the pressure of the water upon the two members will cause them to balance and when the members are thus balanced the zero or other selected graduation will be indicated on the scales. Thus the parts will be held normally balanced even though the level of the liquid should vary because after the position of equilibrium has been reached the buoyancy of the two members will remain relatively the same irrespective of the depth of the liquid.

It will be noted that the displacement of both members 11 and 12 is the same and the displacement due to the descent of either member will offset the upward movement of the other member. The difference between the specific gravities of the two members constitutes the factor for limiting the capacity of the scales. When an article to be weighed is placed on the pan 8 this added weight applied to the member 11 will result in the automatic readjustment of the members 11 and 12 within the fluid due to the change in their relative buoyancy. During this adjustment the wheel 3 will be rotated relative to the index 5 and the graduation brought into line with the index will indicate the weight of the material placed on the pan 8. It will of course be apparent to persons acquainted with the laws of hydromechanics that by utilizing the opposed light and heavy members of like displacement the capacity of the scales is doubled over scales of like proportions utilizing only one member as a balance, this being an added advantage and being due to the fact that the resistance to the movement of the scales away from normal position is equalized between the two members 11 and 12. The baffles or flanges 13 are employed for steadying the movement of the members 11 and 12 within the fluid. Pan 9 is to receive weights forming weighing units.

Figure 2:
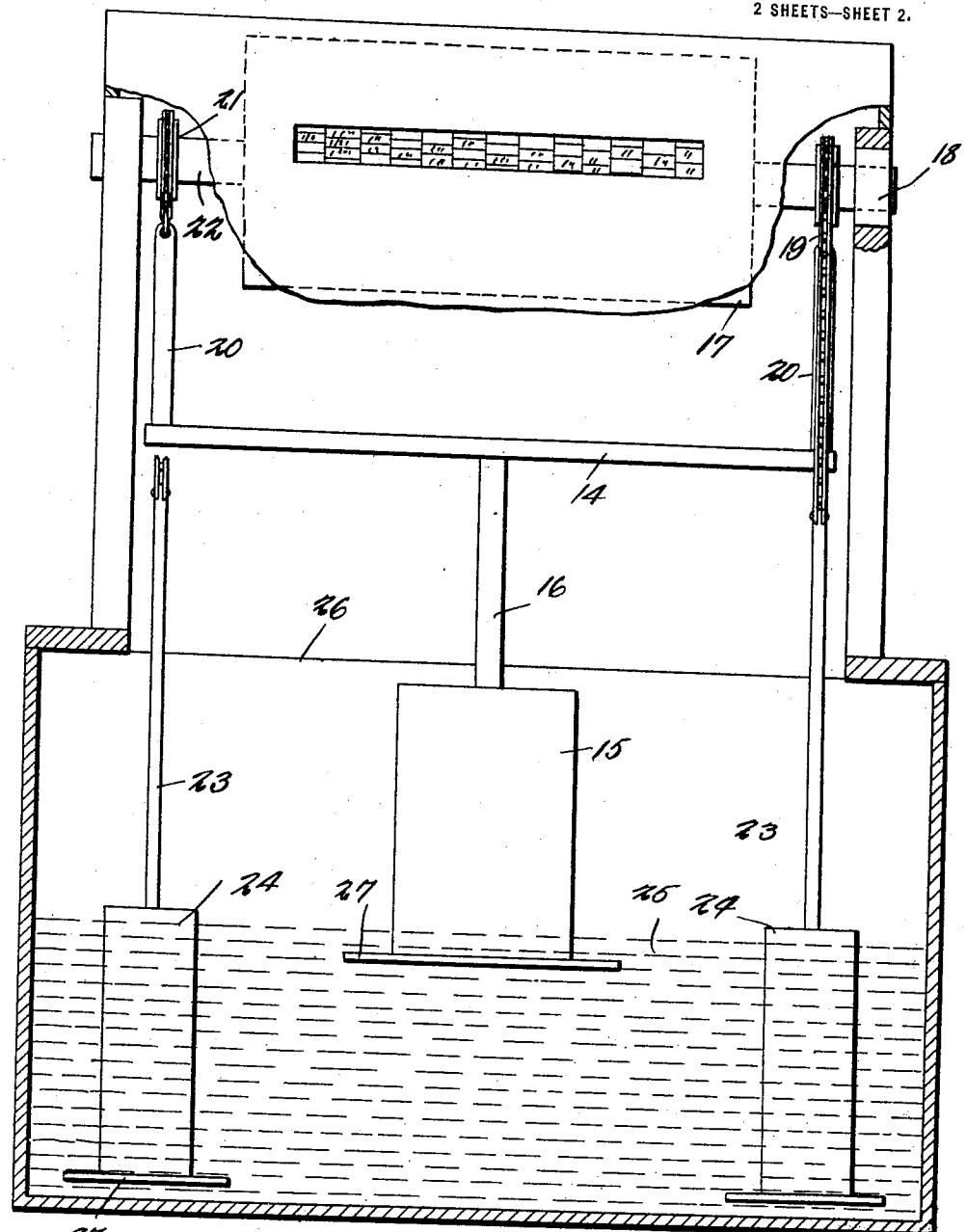
Fig. 2 is a section through another type of scales with which the present improvements are used.

As has heretofore been pointed out the scales can be of various types and the container for the fluid can be upon a counter or other support or can be at any desired distance therebelow. Instead of connecting the pans to a rotary member as indicated in Fig. 1 a single bulk pan can be used as shown at 14 in Fig. 2 and a single controlling member 15 can be arranged under this pan, the same being connected thereto by a stem 16, or in any other suitable manner. A computing cylinder 17 can be mounted for rotation above the pan 14, the same being provided with bearings 18, which are the sole bearings in the scales. Chains 19 can be connected to the ends of the pan 14 or to arms 20 upstanding from and fixed on the pan and these chains engage sprockets 21 secured to the shaft 22 of the cylinder or in any manner mounted so as to rotate synchronously with the cylinder. These chains are attached to arms 23 upstanding from controlling members 24, or, as will be obvious, the chains can be connected directly to the members 24 if so desired.

Although two members 24 have been shown and described as working in opposition to one member 15 it is designed that the displacement of the member 15 be equal to the combined displacements of the members 24 and the said members 24 are of a combined weight greater than the weight of the member 15. All of the members constantly project into the liquid 25 held by the container 26 and baffles or flanges 27 are arranged on the members as shown.

The principle of operation of this modified form of scales is the same as that described in connection with the form illustrated in Fig. 1. In this modified form, however, it is not intended to use weights for increasing the capacity of the scales. When material is placed on the pan 14 the balance of the members 15 and 24 will be readjusted automatically and will cause the rotation of the cylinder 17 and the indication of the weight of the material.

Various other modifications of the present device might be described and illustrated but as the principle involved is the same such course is not deemed necessary.

What is claimed is:—

1. Weighing scales including a fluid body, a movably supported bulk holder, an indicating means, controlling members of different weights extending into the fluid body, means connecting the controlling members to the bulk holder, means for supporting the connecting means so that the controlling members will work in opposition, the combined displacement of the opposed controlling members being constant, and means operated by said members for actuating the indicating means, said members being normally balanced in the fluid to maintain the indicating means normally at a point of starting, said members being shiftable to readjust their balance within the fluid when a material is applied to the bulk holder.

2. Weighing scales including a fluid body, normally balanced controlling members of different specific gravity within the fluid body, means connecting the controlling members, means for supporting the connecting means so that the controlling members will work in opposition, the combined displacement of the opposed controlling members being constant, a bulk holder movable with the lighter member, an indicating means, and means actuated by the members for operating the indicating means.

3. Weighing scales including a fluid body, controlling members of different specific gravities extending into the fluid body, a connection therebetween, said fluid body constituting means for holding the members balanced, a bulk holder connected to the lighter controlling member, an indicating means, and means operated by the relative movement of the members for actuating the indicating means.

4. Weighing scales including a fluid body, a member movable about an axis, separate controlling means connected to said member at opposite sides of its axis and working in opposition, the means at one side of the axis being heavier than but of the same displacement as the means at the other side of the axis, said means projecting into and being normally balanced by the fluid body, and means for supporting material to be weighed from that side of the axis to which the lighter controlling means is connected.

5. Weighing scales including a single fluid body, a member movable about an axis, separate controlling means connected to said member at opposite sides of its axis respectively and working in opposition, within the fluid body, the displacement of the controlling means being constant the means at one side of the axis being heavier than the means at the other side of the axis, and means for receiving the matter to be weighed to shift the movable member and readjust the balance of the controlling members within the fluid.

6. Weighing scales including a movable indicator, weights connected to the indicator and movable in opposite directions respectively, one weight being heavier than the other, a bulk holder movable downwardly with the lighter weight, and a fluid body into which the weights extend to different distances respectively to establish a balance between the weights and to maintain the indicator normally at a predetermined point irrespective of the change in level of the fluid body.

7. Weighing scales including an indicator movable about an axis, separate controlling means connected to said indicator at opposite sides of its axis respectively and working in opposition, the means at one side of the axis being heavier than but of the same displacement as the means at the other side of the axis, and a fluid body into which all of said means constantly project normally to maintain a balance between the oppositely working means and to maintain the indicator normally at a predetermined point irrespective of the changes in the level of the fluid body, the resistance by said fluid body to the movement of the controlling means being equally distributed to opposite sides of the axis.

8. Weighing scales including an indicator movable about an axis, separate controlling means connected to said indicator at opposite sides of its axis respectively and working in opposition, a fluid body into which all of said means constantly project normally to maintain a balance between the oppositely working means and to maintain the indicator normally at a predetermined point irrespective of changes in the level of the fluid body, and a baffle carried by each of said means.

9. Weighing scales including a single fluid body, separate controlling means projecting into the fluid body a connecting means for said controlling means whereby the controlling means are caused to work in opposition, a baffle carried by each of said means, and a load supporting member movable with one of the controlling means.

In testimony that I claim the foregoing as my own, I have hereto affixed my signature in the presence of two witnesses.

WILLIAM G. TEMPLETON.

Witnesses:
 Ivy E. Simpson,
 Herbert D. Lawson.